United States Patent
Hyppänen (10) Patent No.: US 6,293,781 B1
(45) Date of Patent: Sep. 25, 2001

(54) METHOD OF AND APPARATUS FOR DECREASING ATTACK OF DETRIMENTAL COMPONENTS OF SOLID PARTICLE SUSPENSIONS ON HEAT TRANSFER SURFACES

(75) Inventor: Timo Hyppänen, Karhula (FI)

(73) Assignee: Foster Wheeler Energia OY, Helsinki (FI)

(*) Notice: Subject to any disclaimer, the term of this patent is extended or adjusted under 35 U.S.C. 154(b) by 0 days.

(21) Appl. No.: 09/194,756

(22) PCT Filed: Jun. 4, 1997

(86) PCT No.: PCT/FI97/00349

§ 371 Date: May 17, 1999

§ 102(e) Date: May 17, 1999

(87) PCT Pub. No.: WO97/46829

PCT Pub. Date: Dec. 11, 1997

(30) Foreign Application Priority Data

Jun. 5, 1996 (FI) .................................................. 962332

(51) Int. Cl.$^7$ .......................... F22B 31/00; F23C 11/02; B01J 8/26; B09B 3/00
(52) U.S. Cl. .......................... 431/7; 431/170; 110/204; 110/205; 110/343; 110/348
(58) Field of Search .................................. 431/7, 170, 115, 431/116; 110/204, 205, 206, 207, 342, 343, 347, 348; 122/4 D (56) References Cited

U.S. PATENT DOCUMENTS

| | | | |
|---|---|---|---|
| 4,453,497 | 6/1984 | Davis | 122/4 D |
| 4,684,375 | 8/1987 | Morin et al. | 48/197 R |
| 4,709,662 | 12/1987 | Rawdon | 122/4 D |
| 4,813,479 | * 3/1989 | Wahlgren | 110/245 |
| 5,078,100 | 1/1992 | Huschauer et al. | 122/4 D |
| 5,140,950 | 8/1992 | Abdulally | 122/4 D |
| 5,141,708 | * 8/1992 | Campbell, Jr. et al. | 110/245 |
| 5,391,357 | 2/1995 | Stoholm | 422/145 |
| 5,406,914 | * 4/1995 | Hyppanen | 122/4 D |
| 5,463,968 | * 11/1995 | Abulally | 110/245 |
| 5,570,645 | * 11/1996 | Garcia-Mallol | 110/245 |

FOREIGN PATENT DOCUMENTS

| | | |
|---|---|---|
| 63-315809 | * 12/1988 | (JP) . |
| 1-79504 | 3/1989 | (JP) . |
| 1-61509 | 4/1989 | (JP) . |
| 5-52316 | 3/1993 | (JP) . |
| 6-174208 | 6/1994 | (JP) . |
| 94/27717 | 12/1994 | (WO) . |

* cited by examiner

Primary Examiner—Carl D. Price
(74) Attorney, Agent, or Firm—Fitzpatrick, Cella, Harper & Scinto (57) ABSTRACT

A method of and apparatus for decreasing attack of detrimental components of solid particle suspensions on heat transfer surfaces in a heat transfer chamber in a fluidized bed reactor. The method includes introducing solid particles into a first chamber, which is a dilution chamber, on top of a bed of solid particles therein through a dilution chamber inlet disposed in an upper part of the dilution chamber, and discharging solid particles from the dilution chamber through an outlet disposed in a lower part of the dilution chamber, into a heat transfer chamber, and introducing a flushing gas into at least a portion of the dilution chamber for performing at least one of inactivating in and separating from the bed of solid particles in the dilution chamber, impurities detrimental to heat transfer surfaces in the heat transfer chamber.

27 Claims, 4 Drawing Sheets

METHOD OF AND APPARATUS FOR DECREASING ATTACK OF DETRIMENTAL COMPONENTS OF SOLID PARTICLE SUSPENSIONS ON HEAT TRANSFER SURFACES

FIELD OF THE INVENTION

The present invention relates to a method of and an apparatus for decreasing attack of detrimental components of solid particle suspensions on heat transfer surfaces particularly in heat transfer chambers in fluidized bed reactors.

The present invention is particularly applicable for recovering heat from solid particles in circulating fluidized bed reactors, but can also be applied to other fluidized bed reactors. Such circulating fluidized bed reactors comprise a reactor or processing chamber, such as a combustion chamber, having a fluidized bed of solid particles therein, and a heat transfer chamber (HTC), being in solid particle communication with the processing chamber and having heat transfer surfaces disposed therein. The heat transfer chamber may be connected in various ways and various locations to the processing chamber so that there is solid particle exchange between the chambers. The heat transfer chamber may in some special case even be formed within the processing chamber itself.

BACKGROUND OF THE INVENTION

Fluidized bed reactors, such as circulating fluidized bed reactors, are used in a variety of different combustion, heat transfer, chemical and metallurgical processes. Typically heat, originating from combustion or other exothermic processes, is recovered from the solid particles of the fluidized bed by using heat transfer surfaces. Heat transfer surfaces conduct the recovered heat to a medium, such as water or steam, which transfers the heat from the reactor.

The heat transfer surfaces are typically located in the processing chamber or within a convection section arranged in the gas pass after the processing chamber or, in circulating fluidized bed reactors, within a particle separator. Additional heat transfer surfaces are often arranged in a separate heat transfer chamber (HTC), which may be a part of the processing chamber, a separate chamber adjacent to the processing chamber or, in circulating fluidized bed reactors, part of the solid particles recycling system.

An HTC is typically a bubbling fluidized bed, which comprises inlet means for introducing a continuous flow of hot solid particles from the processing chamber into the HTC, heat transfer surfaces, and outlet means for continuously recycling solid particles discharged from the HTC into the processing chamber.

Corrosion is a factor which must always be taken into account when designing heat transfer surfaces. It is especially important when the heat transfer surfaces are in a fluidized bed reactor utilized in processes which use or produce corrosive materials. An example of such is burning difficult fuels, such as straw or RDF, which contain highly corrosive impurities, e.g., chlorides. Corrosive impurities are then also present in the fluidized bed material, and thus come into contact with the heat transfer surfaces in an HTC, leading to rapid corrosion of said surfaces. For example, chlorine in the bed material may cause chloride corrosion on the heat transfer surfaces.

Corrosion problems are especially severe when the temperature in an HTC is high, e.g., due to afterburning, which may easily take place when the HTC is directly connected to the furnace. Afterburning or other chemical processes in an HTC can also lead to a reducing atmosphere, where Co-corrosion easily takes place. Reducing conditions together with chloride deposits are especially susceptible to increased corrosion attack.

Corrosion and erosion based wastage of metals is an essential problem in all bubbling fluidized beds, and many efforts have been made to minimize it. Normal remedies against corrosion are changes in the metal surfaces and their temperatures. Surface treatments, such as chromising, nitriding, or coating with tungsten carbide are in some cases effective. Because all corrosion mechanisms are temperature dependent, corrosion of the heat transfer surfaces can to some extent be avoided by locating the surfaces at appropriate positions in the system.

However, surface treatments are not always feasible, as conditions and temperatures may vary at different locations and stages of the processes. Also, when choosing operating temperatures, the corrosive impurities present in each specific system have to be taken into account. These impurities may vary when using different parameters, such as different fuels, in the process. Therefore, procedures to minimize the risk of corrosion by reducing the concentrations of the actual corrosive impurities are highly wanted.

OBJECTS OF THE INVENTION

It is an object of the present invention to provide a method and an apparatus for heat transfer in fluidized bed reactors in which the above mentioned drawbacks due to attack of detrimental components of solid particle suspensions on heat transfer surfaces in external heat transfer chambers have been minimized.

It is particularly an object of the present invention to provide a method and an apparatus for recovering heat from fluidized bed reactors in which the risk of impurities-based corrosion has been minimized.

SUMMARY OF THE INVENTION

The present invention provides an improved method of and apparatus for decreasing attack of detrimental components of solid particle suspensions on heat transfer surfaces of heat transfer chambers in fluidized bed reactors. The invention is particularly applicable in fluidized bed reactors comprising:

a reactor chamber, such as a processing chamber or a combustion chamber, having a bed of solid particles therein, means for fluidizing said bed of solid particles, a reactor chamber outlet and a reactor chamber inlet, and a heat transfer chamber having a bed of solid particles therein, means for fluidizing said bed of particles, heat transfer surfaces at least partly in contact with said bed of solid particles, a heat transfer chamber inlet connected to said reactor chamber outlet and a heat transfer chamber outlet for solid particles connected to the reactor chamber inlet.

According to a preferred embodiment of the invention, the new method comprises the steps of:

discharging solid particles from said reactor chamber through said reactor chamber outlet;

introducing said discharged solid particles into a dilution chamber, having a bed of solid particles therein;

inactivating in and/or separating from the bed of solid particles in said dilution chamber, impurities detrimental to heat transfer surfaces;

discharging solid particles from said dilution chamber through a dilution chamber outlet therein;

introducing solid particles discharged from said dilution chamber into said heat transfer chamber through said heat transfer chamber inlet;

discharging said solid particles from said heat transfer chamber through said heat transfer chamber outlet and recycling solid particles discharged from said heat transfer chamber to said reactor chamber through said reactor chamber inlet.

Thereby detrimental components, such as corrosion-inducing components, are separated from the solid particle suspension being forwarded through the dilution chamber and/or are inactivated while flowing therethrough. Detrimental gaseous or fine solid particle components may easily be separated by flushing off with a flushing gas, which flushing gas may simultaneously be used to fluidize the bed of solid particles in the dilution chamber. The flushing gas may be an inert gas or a gas inducing a chemical reaction in the bed of solid particles. Thus, air or other oxygen-containing gas may be used to induce oxidizing reactions. The delay time needed for flushing of f or chemical reactions in the dilution chamber may be controlled for optimal results. The delay time may be regulated by, e.g., controlling the bed density, solid particle flow velocity or the bed volume in the dilution chamber.

According to another aspect of the present invention, there is provided in the fluidized bed reactor, having a reactor chamber and a heat transfer chamber, additionally a dilution chamber, having a bed of solid particles therein, means for inactivating impurities, detrimental to heat transfer surfaces, in said bed of solid particles in the dilution chamber, and/or separating impurities therefrom;

a dilution chamber inlet, in fluid communication with said reactor chamber outlet for introducing solid particles from the reactor chamber to said dilution chamber, and a dilution chamber outlet, in fluid communication with said heat transfer chamber inlet, for introducing solid particles from said dilution chamber to said heat transfer chamber.

The dilution chamber may be disposed horizontally adjacent to the heat transfer chamber, if desired, even in a common housing therewith. Thereby, solid particles may be arranged to flow by overflow from the dilution chamber to the heat transfer chamber or through an intermediate transport chamber. The dilution chamber may according to another embodiment of the invention be disposed directly above the heat transfer chamber. Thereby, the dilution chamber may have openings which allow solid particles to flow downward through the openings into the heat transfer chamber. The dilution chamber and the heat transfer chamber may thereby have substantially similar horizontal cross sections and be disposed in a common housing.

It is according to a further aspect of the present invention provided an improved method for recovering heat from solid particles in a fluidized bed reactor, utilizing a heat transfer chamber (HTC), comprising the steps of:

continuously introducing hot solid particles from the processing chamber into the HTC, and continuously discharging said solid particles from the HTC into the processing chamber recovering heat from said solid particles in the HTC by heat transfer surfaces delaying the transfer of said solid particles from the outlet of the processing chamber to the inlet of the region of the heat transfer surfaces by at least 2 seconds.

Also, according to the present invention, an improved apparatus is provided for recovering heat from solid particles in a fluidized bed reactor, utilizing an HTC, said apparatus comprising:

means for continuously introducing solid particles from the processing chamber into the HTC, and continuously discharging said solid particles from the HTC into the processing chamber heat transfer surfaces for recovering heat from said solid particles and means for transporting the recovered heat from the RTC means for delaying the transfer of said solid particles from the outlet of the processing chamber to the inlet to the area of the heat transfer surfaces by at least 2 seconds.

According to the invention, the delay of the transfer of solid particles may be done by a separate chamber, a so called dilution chamber, through which said solid particles are transferred to the HTC.

The desired delay may also be provided by a special structure in the HTC, which structure generally slows down the solid particles and provides a substantially uniform flow of solids into the heat transfer surface area. For example, an HTC may be divided into a first part and a second part by a horizontal or vertical perforated plate, which is located so that the heat transfer surfaces are in the second part. The first part would then function as an intermediate storage, here called a dilution chamber or dilution zone, where the solids stay for some seconds, before they enter the actual heat transfer zone. The dilution chambers and dilution zones may also be called with a common phrase a 'dilution space'.

The main purpose of said dilution space is to promote the removal of harmful impurities, i.e., corrosion-inducing components, from said solids. Therefore, said dilution space is preferably flushed with fluidizing gas to enhance chemical reactions of said impurities and/or to flush off, i.e., remove, said impurities and their reaction products. The dilution may in most cases have the function of lowering the temperature, but if exothermic reactions take place, such as afterburning, in the dilution chamber, then the temperature may rise.

The flushing gas, which may simultaneously be a fluidizing gas, may according to a preferred embodiment be air or some other oxygen-containing gas, because then e.g., carbon monoxide and elementary sulfur can be oxidized to carbon dioxide and sulfur dioxide, respectively, which can be flushed away as gaseous substances from the fluidized bed material. The flushing gas may, if desired, be an inert gas.

Volatile chloride compounds, such as NaCl, HCl, KCl or $ZnCl_2$, and alkalies may be removed from the bed material by flushing gas. With sufficient delay time desired chemical reactions and flushing can be almost complete.

The required delay time depends on the processes in the processing chamber. The dilution space shall be dimensioned such that the delay time is sufficient, e.g., from 2 to 15 seconds. If, in a steady state condition, the volume of solid particles in the dilution space is V, and the solid particles have a density r and mass flow rate $Q_m$, the (average) delay time T of the solid particles in the dilution space is $$T = V * r/Q_m.$$

The density of solid particles in the dilution space depends, to some extent, on the fluidizing gas flow velocity. By lowering the fluidizing gas flow velocity, the density of the solid particles can be increased, and by that the delay time T is, according to the formula above, made longer.

However, simultaneously the effects of the fluidizing gas in enhancing the chemical reactions of the harmful impurities and in flushing the reaction products from the solids are decreased. Therefore, decreasing the fluidizing gas flow velocity may not as such provide an effective means to control the operation of a dilution space.

In order to maintain appropriate chemical reactions and flushing conditions in an upwardly flowing bed of particles, while simultaneously increasing bed density, fluidization may be decreased in the lower parts of the bed only and maintained at a normal velocity in the upper parts of the bed. The fluidization in the upper parts may be achieved with nozzles disposed in the walls at high vertical levels or with nozzles reaching high up above the grid.

Assuming that the density of the solid particles in a dilution space is constant, the delay time depends only on the mass flow rate $Q_m$ and the steady state volume V of the solid particles therein. In steady state conditions, the mass flow rate into the dilution space equals the mass flow rate out from there. If the construction of the dilution space is such that said volume V is constant, the flow velocity $Q_m$ into the dilution space alone determines the delay time T.

A dilution space, from where the fluidized bed material is discharged by flowing over a weir, is an example of a construction with a constant volume V. If, for example, an HTC with such a dilution space is part of the recycling system of a circulating fluidized bed, the circulation rate of the system determines the mass flow rate $Q_m$ and the delay time T. Such a construction can be satisfactory, when it is dimensioned such that with the highest flow velocity $Q_m$ the delay time T is still sufficient. In conditions of lower mass flow rate $Q_m$, the delay time T becomes longer, and thus provides better dilution of the harmful impurities.

The delay time T in a dilution space is constant, if the output flow velocity and the volume of solids therein, and their density, are constant. One way to have the volume of solids in a dilution space constant, at its maximum, is to have the output mass flow rate lower than the available input mass flow rate, and return surplus solids directly into the reactor chamber.

A constant delay time can be provided by keeping the bed density and the output flow rate constant, e.g. by fluidizing gases. If, correspondingly, the output flow rate is made controllable, a dilution space with an adjustable delay time is provided.

A controllable delay time may be useful when the process parameters, such as the fuel of a combustor, are varying. As a drawback this kind of systems has a connection between the delay time and the heat transfer rate in the HTC.

The function of a classifying chamber can also be added to a dilution chamber, the classifying chamber letting into a heat transfer zone only solid material, which material has a grain size below a certain limit. The classifying can be done with a mechanical separator or by fluidizing gas. A chamber which is used as a classifier must be provided with a separate discharge channel for coarse material.

BRIEF DESCRIPTION OF THE DRAWINGS

The above and other objects, features and advantages of the present invention will become apparent from the following description, reference being made to the accompanying drawings, in which.

DETAILED DESCRIPTION OF THE INVENTION

Figure 1:
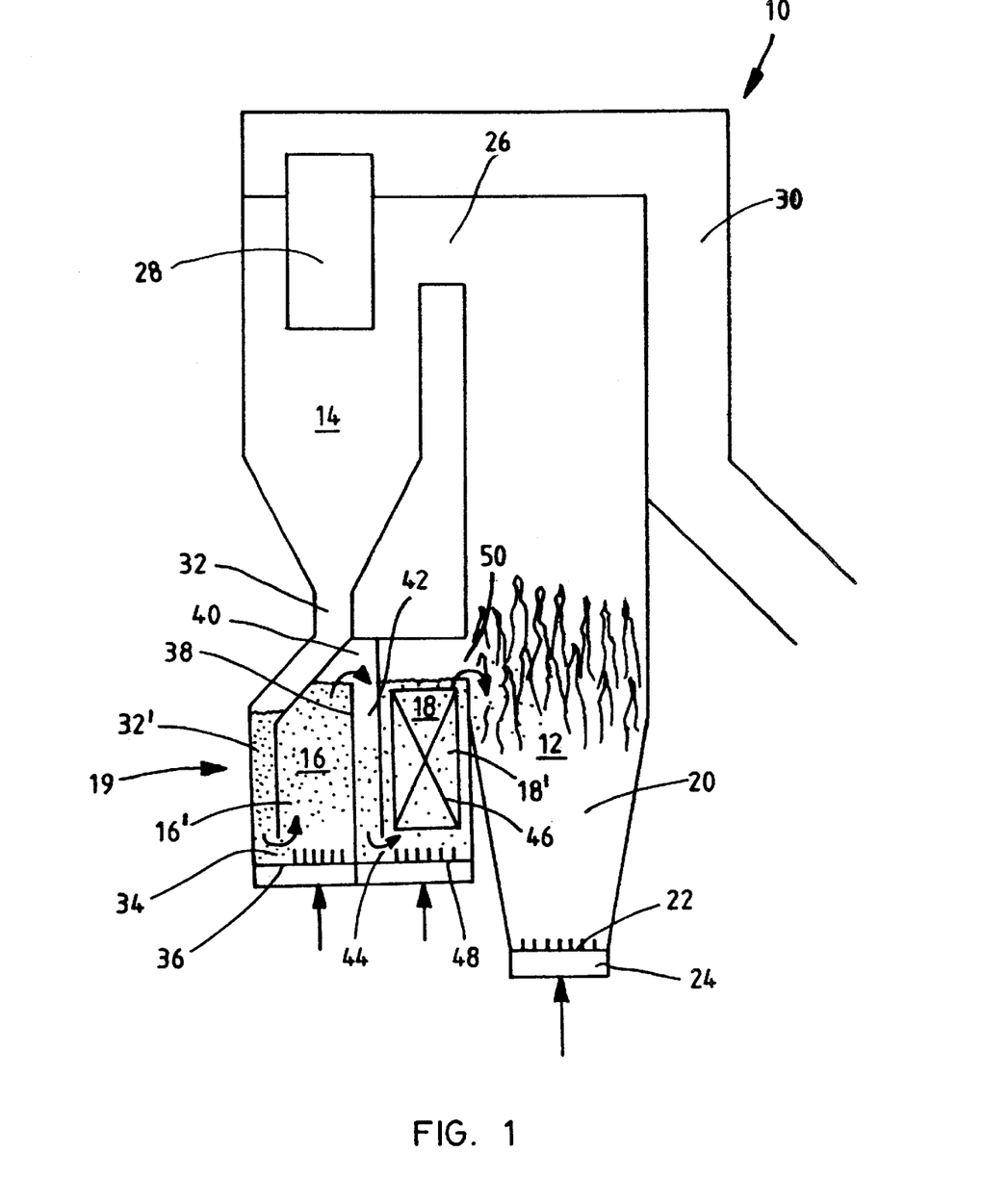
FIG. 1 is a schematic cross-sectional view of a circulating fluidized bed reactor including a dilution chamber according to the present invention.
Figure 2:
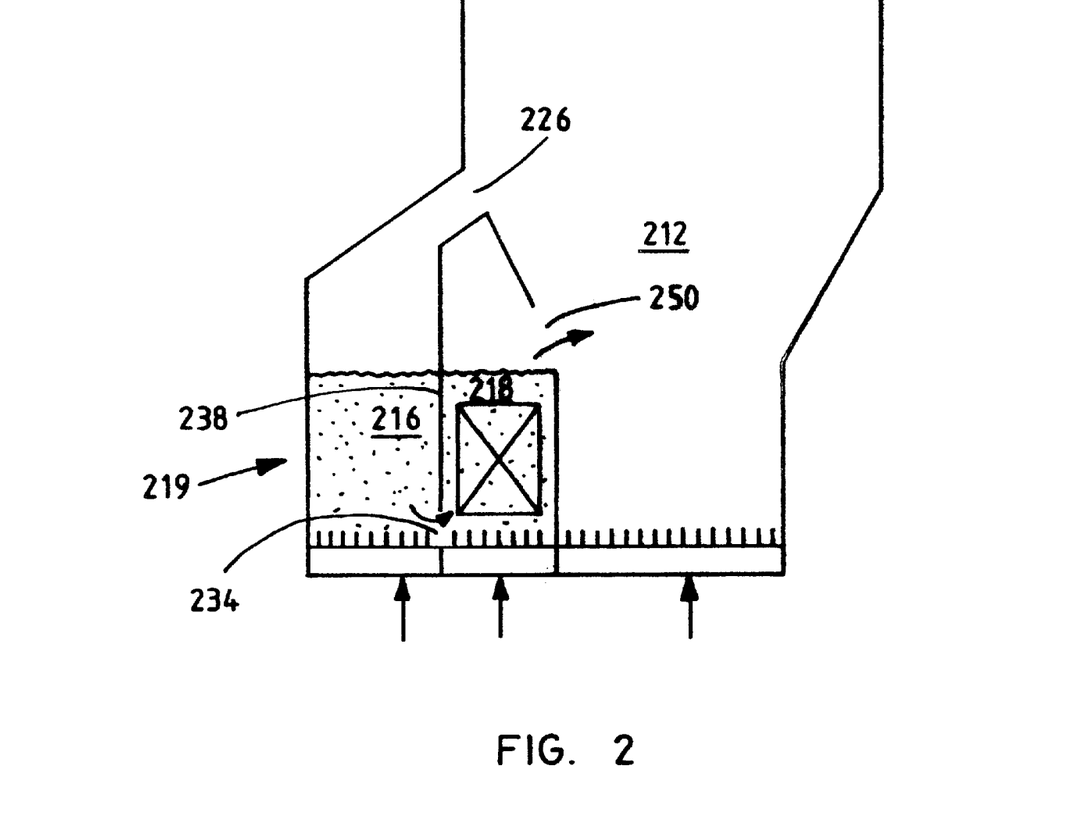
FIG. 2 is a schematic cross-sectional view of the lower part of a fluidized bed reactor including a dilution chamber according to another exemplary embodiment of the present invention.
Figure 3:
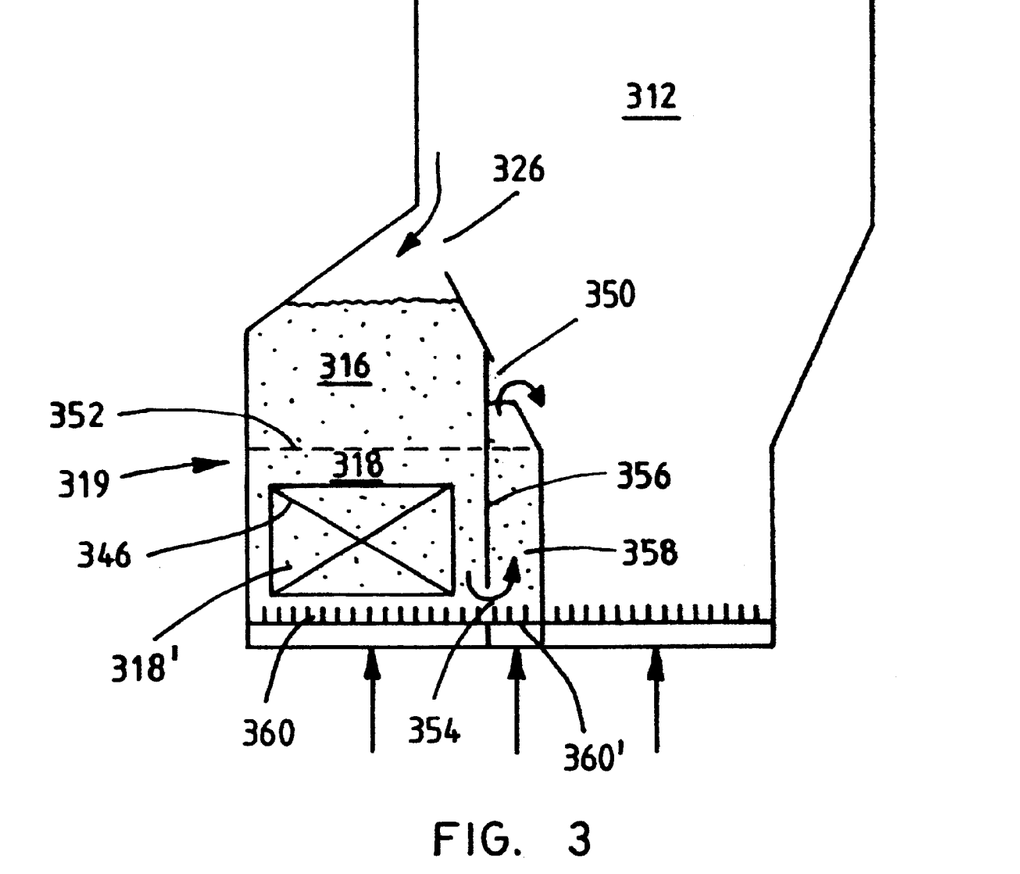
FIGS. 3 and 4 are schematic cross-sectional views of further fluidized bed reactors including dilution chambers according to other exemplary embodiments of the present invention.
Figure 4:
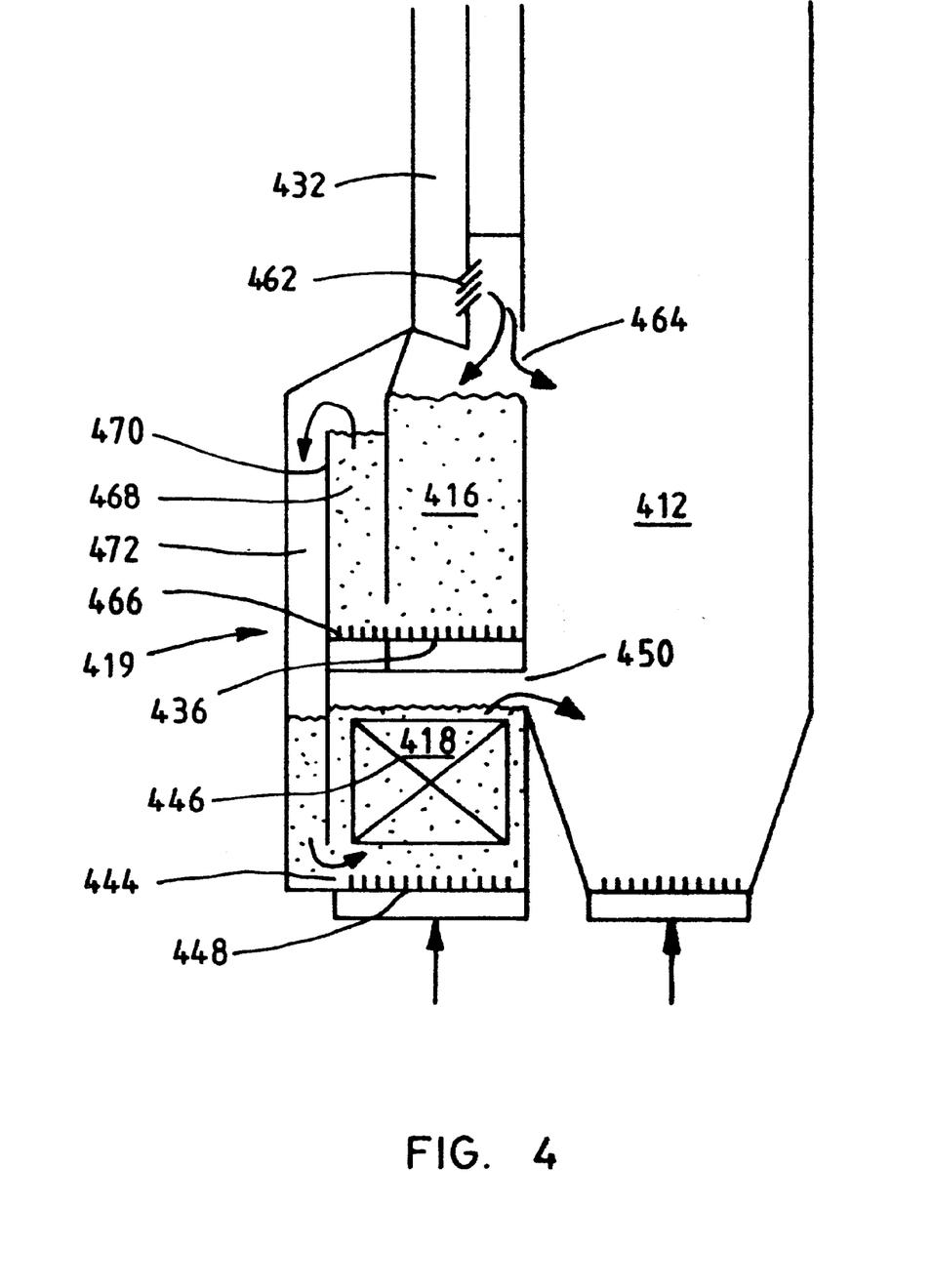

Referring now to the figures, the same reference numerals as in FIG. 1 will designate the same parts in FIGS. 2 to 4. Reference numerals in FIG. 2, however, being preceded by "2" and reference numerals in FIGS. 3 and 4 being preceded by "3" or "4" correspondingly.

The method and apparatus of the present invention will first be described in connection with a circulating fluidized bed reactor 10, having a reactor chamber 12, a particle separator 14, a dilution chamber 16 and a heat transfer chamber 18. The dilution chamber 16 and the heat transfer chamber 18 are formed in a common housing 19.

A fluidized bed of solid particles 20 is provided in the reactor chamber 12. Means for introducing fluidizing gas, such as a grid 22 and a windbox 24 is provided in the bottom part of the reactor chamber, for fast fluidization of the bed 20. A reactor gas outlet 26 is provided in the uppermost part of the reactor chamber 12, for discharging solid particles entrained in flue gas from the reactor chamber. Solid particles are separated from the gas in the particle separator 14 and gas is discharged through a gas outlet 28 and convection section 30. Solid particles separated from the gas are transported downward through a return duct 32 and through a dilution chamber inlet 34 into the lower part of the dilution chamber 16. Solid particles gather as a downward flowing particle bed 32' in the lowermost part of the return duct 32. Particles introduced into the bed 16' of solid particles in the dilution chamber 16 are transported upwardly through the bed by fluidizing gas introduced through a grid 36 in the bottom of the dilution chamber. The fluidizing gas simultaneously provides a flushing gas for removing detrimental components from the bed of solid particles. The fluidizing gas may also be used to control the bed density. Increased density increases the delay time of solid particles in the dilution chamber.

The dilution chamber 16 and the heat transfer chamber 18 are separated from each other by a partition wall 38, preventing solid particles from flowing freely from one chamber to the other. A free passage 40, forming a dilution chamber outlet, is provided above the partition wall allowing solid particles to be discharged by overflow from the dilution chamber 16. Gas is also discharged from the dilution chamber through the passage 40.

In steady state conditions, material is discharged from the dilution chamber 16 through passage 40 at the same rate as material enters therein. While the material is in the dilution chamber, it is flushed with gas, provided through the grid 36. The solid particles in the dilution chamber 16 and in the bottom part of the return duct 32 act as a gas seal between the lower part of the particle separator and the reactor chamber.

The vertical level of the upper end or rim of the partition wall 38 may be made higher or lower, thereby controlling the level of the passage 40 and the bed volume in the dilution chamber 16. Larger bed volumes provide longer delay times than smaller bed volumes.

Solid particles being discharged from the dilution chamber have been "cleaned" from detrimental components by flushing and possible inactivation of active detrimental components. Thus cleaned particles flow into an intermediate transport chamber 42 disposed between the dilution chamber 16 and the heat transfer chamber 18. Solid particles descend downward in the transport chamber 42 toward an opening 44 in the lower part thereof, said opening being in communication with the heat transfer chamber 18. The opening 44 forms an inlet to the lower part of the heat transfer chamber 18.

Heat transfer surfaces 46 are provided in the heat transfer chamber 18. Solid particles introduced into the bed 18' in chamber 18 are fluidized by fluidizing gas introduced through grid 48 and flown by overflow through heat transfer chamber outlet 50, the outlet simultaneously forming a reactor chamber inlet, opening into the lower part of the reactor chamber. Gases being discharged from the heat transfer chamber are simultaneously introduced into the reactor chamber. Also, gases from the dilution chamber may be discharged through the same outlet if not discharged through a separate conduit. In steady state conditions, material which enters the heat transfer chamber is discharged at the same rate through outlet 50.

In the FIG. 1 construction, the volume of the solids in the dilution chamber is substantially constant, as determined by the upper end of the partition wall 38. Thus, the delay time, i.e., the time it takes for solids to pass the dilution space, is strongly determined by the circulation rate of the reactor. Some controllability, in terms of dilution of the harmful impurities, can be provided according to the invention by varying the fluidizing gas flow rate and thereby the density of the bed in the dilution chamber, which influences the delay time of particles in the bed.

In the FIG. 1 embodiment, it is possible to shut off fluidization in a part of the heat transfer chamber 18, whereby solid particles may flow directly from dilution chamber 16 on top of bed 18' to the opening 50.

FIG. 2 shows a dilution chamber 216 and heat transfer chamber 218 in a common housing 219 connected to an internal solid particle circulation in the lower part of a fluidized bed reactor chamber 212. Solid particles are directly introduced through reactor chamber outlet 226 into the dilution chamber 216. In the embodiment shown in FIG. 2, the rate of solids entering the dilution chamber depends on the hydrodynamics of the solid bed material within the reactor chamber.

Solid particles flow downward in the dilution chamber and are discharged therefrom through an opening 234 in the lower part of a partition wall 238. Discharged solid particles are directly introduced on top of a bed of solid particles in the adjacent heat transfer chamber 218. An outlet opening 250 leads solid particles by overflow from the heat transfer chamber 218 to the lower part of the reactor chamber 212.

FIG. 3 shows a schematic view of another embodiment of the present invention, according to which a dilution chamber 316 is formed in a common housing 319 with the heat transfer chamber 318. The housing 319 is divided into an upper part and a lower part by a flow equalizer, i.e., a horizontal perforated plate 352. Heat transfer surfaces 346 are provided in the lower part 318 of the housing in a bed 318' of solid particles therein. The upper part forms a dilution zone. The flow equalizer 352 prevents substantially mixing of particles between the upper and lower zones, i.e., between dilution and heat transfer zones. The flow equalizer 352 also provides a steady solid particle flow from the dilution zone 316 to the heat transfer zone 318 and prevents dead zones from forming in the bed in the heat transfer chamber. The solid material is discharged from the heat transfer chamber through an opening 354 in the lowermost part of a partition wall 356 into an adjacent vertical transport passage 358 in communication with the inlet 350 to the lower part of the reactor chamber. Means 360' for fluidizing the bed in the heat transport passage 358 lifts solid particles upward and assures the discharge of solid material from the heat transfer chamber into the reactor chamber. The fluidizing gas introduced into the heat transfer chamber 318 flows through openings in the perforated plate 352 into the dilution chamber 316 there above, acting there as flushing gas.

Solid material is in the FIG. 3 embodiment introduced through reactor chamber outlet opening 326 in the reactor chamber wall into the dilution chamber 316 and flows therefrom through the perforated plate 352 into the heat transfer chamber. The purpose of the perforated plate 352 is to dampen the highest amplitudes of the turbulent motion of the particles and to provide a substantially uniform flow of solids to the heat transfer chamber.

The operation of the dilution chamber 316 is determined by solids flow rate through the opening 326 and the fluidizing gas flow velocities provided by means 360 and 360'. The level of solids in channel 358 is always to the edge of the opening 350, but by decreasing the fluidization rate in channel 358, the density of solids therein is increased. Then, also, the volume of solids in dilution chamber 316 and the delay time therein are increased. The reason for this is that the hydrostatic pressure of solids in chambers 318 and 316 is always in balance with that of the solids in channel 358. By increasing the fluidization rate in dilution chamber 316, the level of solids therein is correspondingly increased, but the delay time is not increased, because the density of the solids in the dilution chamber is simultaneously decreased. However, said increase of fluidization has a positive effect to the operation of the dilution chamber by enhancing the flushing of the detrimental impurities therefrom.

The delay time T decreases with the increase of solids flow rates through the opening 326. However, due to frictional effects, the level of solids in the dilution chamber starts then becoming higher than in equilibrium, balancing thus to some extent the decrease of T. Eventually, there is a maximum flow rate through channel 358, and with the highest input flow rates the dilution chamber fills up. Thus, the construction illustrated in FIG. 3 provides a self balancing delay time with a lower limit.

The embodiment shown in FIG. 3 may alternatively be realized in a horizontal housing divided by a vertical perforated plate into two horizontally adjacent chambers, a dilution chamber and a heat transfer chamber.

FIG. 4 is still another schematic view of a lower part of a circulating fluidized bed reactor chamber 412 with a housing 419, having a dilution chamber 416 and heat transfer chamber 418, connected adjacently thereto. The dilution chamber 416 is disposed above the heat transfer chamber 418 in the common housing 419. Solid material is entered into the dilution chamber 416 by a return duct 432, which has a gas seal 462 in its lower part.

The FIG. 4 system may be operated so, that the dilution chamber 416 is full, i.e., filled to the edge of an opening 464 in its upper part, said opening allowing solid particles to flow therethrough into the reactor chamber 412. On the bottom of the dilution chamber 416, there are means 436 for providing flushing gas, which flows through the bed of solid particles in the dilution chamber, and through opening 464 to the reactor chamber. In the dilution chamber, there are also means 466 for providing fluidizing gas to an outlet channel 468, for discharging solid particles at a controlled velocity from the dilution chamber and leading said particles towards an inlet 444 to the heat transfer chamber 418.

By means of the fluidizing gas provided by means 466, a controllable amount of solid particles is discharged through the outlet channel 468 over a weir 470 to a second channel 472 which leads the solid particles to the heat transfer chamber 418. The height of the weir 470 is preferably such that without fluidizing gas no solids are discharged from the first channel 468 to the second channel 472. The heat transfer chamber comprises heat transfer surfaces 446 and means 448 to provide fluidizing gas to assure the discharge of solid material from the heat transfer chamber through opening 450 into the reactor chamber.

As described above, the rate of discharging particles from the dilution chamber in this system determines the flow rate $Q_m$. Because $Q_m$ is thus controllable and the volume of solids in the dilution space is constant, FIG. 4 shows a system with a controllable delay time.

While the present invention has been described in detail, including preferred embodiments thereof, it is to be understood that various modifications are possible within the scope and spirit of the present invention. Thus, it is possible to combine embodiments shown above and introduce solid particles from an external solid particle circulation, via a return duct, and/or directly from the reactor chamber from the internal solid particle circulation therein, to the dilution chamber. At high load, solid particles may be introduced solely or mainly through the return duct, and outlet openings at lower levels in the reactor chamber may function as openings for recycling countercurrently by overflow superfluously discharged solid material back into the reactor chamber. At low load conditions, solid particles may be introduced solely or mainly from the internal circulation through outlet openings at lower levels in the reactor chamber walls.

What is claimed is:

1. A method of decreasing attack of detrimental components of solid particle suspensions on heat transfer surfaces in a heat transfer chamber in a fluidized bed reactor, the reactor including a reactor chamber having a bed of solid particles therein, means for fluidizing the bed of solid particles in the reactor chamber, a reactor chamber outlet and a reactor chamber inlet, a first chamber in communication with the reactor chamber outlet and having a bed of solid particles therein, a heat transfer chamber having a bed of solid particles therein, means for fluidizing the bed of solid particles in the heat transfer chamber, heat transfer surfaces at least partly in contact with the bed of solid particles in the heat transfer chamber, a heat transfer chamber inlet and a heat transfer chamber outlet connected to the reactor chamber inlet, whereby in the fluidized bed reactor, (i) solid particles are discharged from the reactor chamber through the reactor chamber outlet and introduced into the first chamber, (ii) solid particles are introduced from the first chamber into the heat transfer chamber, and (iii) solid particles are recycled from the heat transfer chamber through the reactor chamber inlet into the reactor chamber, said method comprising:

introducing solid particles into the first chamber, which is a dilution chamber, on top of a bed of solid particles therein through a dilution chamber inlet disposed in an upper part of the dilution chamber, and discharging solid particles from the dilution chamber through an outlet disposed in a lower part of the dilution chamber into the heat transfer chamber; and introducing a flushing gas into and upwardly through at least a portion of the dilution chamber for performing at least one of inactivating in and separating from the bed of solid particles in the dilution chamber, impurities detrimental to heat transfer surfaces in the heat transfer chamber.

2. The method according to claim 1, wherein the reactor chamber is one of a processing chamber and a combustion chamber.

3. The method defined in claim 1, wherein the flushing gas is an oxygen-containing gas, providing oxidizing reactions in the dilution chamber.

4. The method according to claim 3, wherein the oxygen-containing gas is air.

5. The method defined in claim 1, wherein the flushing gas is a fluidizing gas fluidizing the bed of solid particles in the dilution chamber.

6. The method defined in claim 1, further comprising controlling delay time for solid particles flowing from the reactor chamber outlet through the dilution chamber to the heat transfer chamber inlet by controlling the delay time for solid particles in the dilution chamber, for providing enough time for performing at least one of separating impurities from and inactivating impurities in the solid particles flowing from the reactor chamber to the heat transfer chamber.

7. The method defined in claim 6, further comprising controlling the delay time by controlling the density of the bed of solid particles in the dilution chamber.

8. The method defined in claim 6, further comprising controlling the delay time by controlling the volume of the bed of solid particles in the dilution chamber.

9. The method defined in claim 1, wherein said step of introducing a flushing gas is for inactivating corrosive components in solid particle flow from the reactor chamber outlet to the heat transfer chamber inlet into the dilution chamber.

10. The method defined in claim 1, further comprising introducing solid particles discharged from the reactor chamber on top of a fluidized bed of particles in a first zone of a housing being divided by a perforated plate into a first zone, providing a dilution chamber, and a second zone, providing a heat transfer chamber.

11. The method defined in claim 1, wherein a delay time of solid particles in the dilution chamber is greater than two seconds.

12. The method according to claim 11, wherein the delay time is between about two and about fifteen seconds.

13. The method defined in claim 1, wherein the direction of flow of solid particles in the dilution chamber is from the top thereof towards the bottom thereof.

14. The method defined in claim 1, wherein the direction of flow of solid particles in the heat transfer chamber is from the bottom thereof towards the top thereof.

15. The method defined in claim 1, wherein the direction of flow of solid particles in the heat transfer chamber is from the top thereof towards the bottom thereof.

16. An apparatus for decreasing attack of detrimental components of solid particle suspensions on heat transfer surfaces in a heat transfer chamber in a fluidized bed reactor, said apparatus comprising:

a reactor chamber having a bed of solid particles therein, means for fluidizing the bed of solid particles in said reactor chamber, a reactor chamber outlet and a reactor chamber inlet;

a first chamber, in communication with said reactor chamber outlet and having a bed of solid particles therein, said first chamber being a dilution chamber, having (i) a dilution chamber inlet for solid particles in an upper part thereof, (ii) an outlet for solid particles in a lower part thereof, and (iii) means for introducing flushing gas into and upwardly through at least a portion of the dilution chamber for performing at least one of inactivating in and separating from the bed of solid particles in said dilution chamber, impurities detrimental to heat transfer surfaces in a heat transfer chamber; and a heat transfer chamber having a bed of solid particles therein, means for fluidizing the bed of solid particles in said heat transfer chamber, heat transfer surfaces at least partly in contact with the bed of solid particles in said heat transfer chamber, a heat transfer chamber inlet in communication with said first chamber for receiving solid particles from said first chamber, and a heat transfer chamber outlet connected to said reactor chamber inlet.

17. An apparatus as defined in claim 16, wherein said reactor chamber is one of a processing chamber and a combustion chamber.

18. An apparatus as defined in claim 16, further comprising means for controlling a delay time for solid particles flowing from said reactor chamber outlet through the dilution chamber to said heat transfer chamber inlet by controlling the delay time for solid particles in said dilution chamber, for providing enough time for performing at least one of separating impurities from and inactivating impurities in the solid particles flowing from said reactor chamber to said heat transfer chamber.

19. An apparatus as defined in claim 18, wherein said means for controlling delay time in said dilution chamber includes means for controlling the fluidization of the bed of solid particles in said dilution chamber, for controlling the density of solid particles in said bed.

20. An apparatus as defined in claim 18, wherein said means for controlling delay time in said dilution chamber includes means for controlling the volume of the bed of solid particles in said dilution chamber.

21. An apparatus as defined in claim 16, wherein said dilution chamber and said heat transfer chamber are provided in a common housing having a partition wall separating said dilution chamber from said heat transfer chamber.

22. An apparatus as defined in claim 16, wherein said dilution chamber and said heat transfer chamber are provided on top of each other in a common housing divided by a horizontal perforated plate into two chambers.

23. An apparatus as defined in claim 16, further comprising a transport chamber disposed between said dilution chamber and said heat transfer chamber, wherein the wall between said dilution chamber and said transport chamber allows solid particles to flow into an upper part of said transport chamber, and the wall between said transport chamber and said heat transfer chamber has at least one opening in a lower part thereof, forming said heat transfer chamber inlet, for allowing solid particles to flow from a lower part of said transfer chamber to the lower part of said heat transfer chamber.

24. An apparatus as defined in claim 16, wherein said heat transfer chamber is disposed adjacent to the lower part of said reactor chamber and has a common wall portion therewith, and said common wall portion having an opening, forming said heat transfer chamber outlet and said reactor chamber inlet, allowing solid particles to flow from said heat transfer chamber to said reactor chamber.

25. An apparatus as defined in claim 24, wherein said opening in said common wall portion is disposed at a level providing solid particles to flow by overflow from the top of the bed of solid particles in said heat transfer chamber into said reactor chamber.

26. An apparatus as defined in claim 16, further comprising a vertical transport conduit disposed between said heat transfer chamber outlet and said reactor chamber inlet in the lower part thereof, for transporting solid particles from said heat transfer chamber into said reactor chamber.

27. An apparatus as defined in claim 16, further comprising means for discharging flushing gas from said dilution chamber to said reactor chamber.

\* \* \* \* \*